(12) United States Patent
Mettler et al.

(10) Patent No.: US 10,391,445 B2
(45) Date of Patent: Aug. 27, 2019

(54) SEQUESTRATION OF $CO_2$ USING CLATHRATES

(71) Applicant: ExxonMobil Research and Engineering Company, Annandale, NJ (US)

(72) Inventors: Matthew S. Mettler, Tomball, TX (US); Ashish B. Mhadeshwar, Garnet Valley, PA (US); Jean W. Beeckman, Columbia, MD (US); Robert D. Denton, Bellaire, TX (US); Jason W. Lachance, Magnolia, TX (US); Rustom M. Billimoria, Hellertown, PA (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 0 days.

(21) Appl. No.: 15/877,713

(22) Filed: Jan. 23, 2018

(65) Prior Publication Data

US 2018/0229178 A1 Aug. 16, 2018

Related U.S. Application Data

(60) Provisional application No. 62/459,169, filed on Feb. 15, 2017.

(51) Int. Cl.
*B09B 1/00* (2006.01)
*B01D 53/04* (2006.01)
(Continued)

(52) U.S. Cl.
CPC ......... *B01D 53/1475* (2013.01); *B01D 53/04* (2013.01); *B01D 53/1493* (2013.01); *B01D 53/62* (2013.01); *B01D 53/73* (2013.01); *B09B 1/002* (2013.01); *F17C 1/007* (2013.01); *B01D 2252/1035* (2013.01); *B01D 2257/504* (2013.01); *Y02A 50/2342* (2018.01);
(Continued)

(58) Field of Classification Search
None
See application file for complete search history.

(56) References Cited

U.S. PATENT DOCUMENTS 2,410,583 A 11/1946 Hutchinson
5,434,330 A 7/1995 Hnatow et al.
(Continued)

FOREIGN PATENT DOCUMENTS

EP 1975058 A2 10/2008
JP H0538429 A 2/1993
(Continued)

OTHER PUBLICATIONS

Kang et al., "Hydrate phase equilibria of the guest mixture containing CO2, N2, and Tetrahydrofuran," Fluid Phase Equilibria, Jul. 2001, pp. 101-109, vol. 185, iss. 1-2, ScienceDirect.
(Continued)

*Primary Examiner* — Daniel Berns
(74) *Attorney, Agent, or Firm* — Priya G. Prasad; Andrew T. Ward (57) ABSTRACT

Processes for forming and sequestering $CO_2$ clathrates in a marine environment are disclosed.

10 Claims, 7 Drawing Sheets

(51) Int. Cl.
*B01D 53/14* (2006.01)
*B01D 53/62* (2006.01)
*B01D 53/73* (2006.01)
*F17C 1/00* (2006.01)
*C10L 3/10* (2006.01)

(52) U.S. Cl.
CPC ............... *Y02C 10/04* (2013.01); *Y02C 10/06* (2013.01); *Y02C 10/08* (2013.01)

(56) References Cited

U.S. PATENT DOCUMENTS

| | | |
|---|---|---|
| 5,820,300 A | 10/1998 | Sonoda et al. |
| 6,028,234 A | 2/2000 | Heinemann et al. |
| 6,111,155 A | 8/2000 | Williams et al. |
| 6,797,039 B2 | 9/2004 | Spencer |
| 2013/0012751 A1 | 1/2013 | Turner et al. |
| 2013/0266380 A1* | 10/2013 | Capron ..................... F16L 1/24 405/184.4 |
| 2014/0079594 A1 | 3/2014 | Caldeira et al. |
| 2018/0178161 A1* | 6/2018 | Mettler .............. B01D 53/1493 |

FOREIGN PATENT DOCUMENTS

| | | |
|---|---|---|
| WO | 94/03288 A1 | 2/1994 |
| WO | 2016/088002 A1 | 6/2016 |

OTHER PUBLICATIONS

The International Search Report and Written Opinion of PCT/US2018/014810 dated Jul. 2, 2018.

Kim et al., "CO2 Capture from flue gas using clathrate formation in the presence of thermodynamic promoters", Energy, 118, 2016, 950-956.

* cited by examiner

SEQUESTRATION OF CO₂ USING CLATHRATES

CROSS-REFERENCE TO RELATED APPLICATIONS

This application claims the benefit of U.S. Provisional Application No. 62/459,159, filed on Feb. 15, 2017, the entire contents of which are incorporated herein by reference.

FIELD

This disclosure relates to the sequestration of $CO_2$ on or near the ocean floor using $CO_2$ clathrates and/or hydrates.

BACKGROUND

Separation of $CO_2$ from power plant flue gas and other gas mixtures that result from industrial processes and other fixed point sources is critical for reducing greenhouse gas emissions, and especially such emissions due to electricity generation. Technologies exist today to remove $CO_2$ from flue gas, such as absorptive technologies based on amines, but these technologies are costly and significantly reduce overall power plant efficiency. An additional challenge of today's $CO_2$ separation processes is that subsurface geologic structures must be present and able to receive $CO_2$. Locations which do not have suitable geologic formations will not be able to sequester the $CO_2$, even if it can be separated from the flue gas mixture. Thus, there exists a need to develop an improved technology capable of not only removing $CO_2$ from flue gas or other industrially produced waste gas mixtures, but also providing the captured $CO_2$ in a form, such as a solid hydrate, that is amenable to sequestration by methods other than injection into subsurface geologic formations.

U.S. Pat. No. 5,434,330 describes a process for separating clathrate forming gases by first contacting a gaseous stream with an aqueous solvent to form a hydrate suspension. The clathrate forming gases are then selectively recovered by exposing the hydrate suspension (or the separated hydrate) to increased temperature and/or reduced pressure.

US20130012751 describes a process by which the corrosive elements of a gas stream (e.g. $CO_2$, $H_2S$) can be separated from hydrocarbon gases in a hydrate-based separator using a similar approach as outlined in the U.S. Pat. No. 5,434,330. The process yields a gas product, e.g. a purified natural gas product that is less corrosive due to removal of $H_2S$ and $CO_2$ from the natural gas.

SUMMARY

Processes for forming and sequestering $CO_2$ clathrate are disclosed. In one aspect, the process comprises forming a $CO_2$ clathrate, and encapsulating the $CO_2$ clathrate within a molecular barrier, wherein a molecular barrier does not allow migration of molecules from the hydrate to the environment in which the hydrate is sequestered or from the environment to the hydrate. In certain embodiments the molecular barrier comprises one or more plastics such as polypropylene or polyethylene. Additionally or alternatively, the molecular barrier can include naturally occurring materials, such as clays. Additionally or alternatively, the molecular barrier can include a combination of naturally occurring and man-made materials.

In one aspect, forming the $CO_2$ clathrate includes providing a $CO_2$-rich stream from a separate refinery process such as a $CO_2$ adsorption or absorption process; providing an aqueous phase stream in a countercurrent flow to form a $CO_2$ clathrate in the aqueous phase, a temperature $T_f$ being maintained at a gas feed stage f in the countercurrent flow, a temperature $T_2$ such that $T_2 < T_f$ being maintained at a stage $n > f$, and a temperature $T_1$ being maintained at a stage $m \leq f$ such that $T_1 \geq T_f$; wherein: $T_2$ is in the range from the incipient vapor temperature for $CO_2$ to the incipient clathrate temperature for $CO_2$ at the operating pressure of the process, and $T_1$ is a temperature at or below a temperature of convergence of the incipient $CO_2$ clathrate formation and incipient $CO_2$ vapor formation curves at the operating pressure of the process. In some embodiments, the aqueous phase is seawater.

The forming of a $CO_2$ clathrate can also include injecting the $CO_2$ clathrate with a hydrate formation promoter. In certain aspects, the hydrate formation promoter is one of acetone, propane, isobutane, cyclopentane, carbon tetrachloride, bromoform, chloroform, ethylene dichloride, methylene chloride, methyl iodide, methylene iodide, and the tri-halogen compounds of methane and ethane, propylene oxide, 1,4-dioxane, tetrahydrofuran and $H_2S$, surfactants (e.g. TBAB—Tetra n-Butyl Ammonium Bromide, TBAF—Tetra n-Butyl Ammonium Fluoride, TBACl—Tetra n-Butyl Ammonium Chloride), and enzymes (glucoamylase).

The process may further comprise depositing the encapsulated $CO_2$ clathrate on the ocean floor at a sufficient depth such that the $CO_2$ clathrate will not decompose into liquid or vapor $CO_2$ and water. The process of depositing can include transferring the encapsulated $CO_2$ clathrate to a seagoing vessel; transporting the seagoing vessel to a deposition location; and depositing the encapsulated $CO_2$ clathrate on the ocean floor. In another aspect, the $CO_2$ clathrate can be formed and encapsulated on the seagoing vessel while in transport and then deposited on the ocean floor. The clathrate should be deposited at a sufficient depth such that the $CO_2$ clathrate will not decompose into liquid or vapor $CO_2$ and water. That depth can be less than 800 m, less than 600 m, less than 400 m, less than 200 m, less than 100 m. In a preferred embodiment, the sufficient depth is from 100 m-400 m.

In an effort to anchor and/or ensure that the $CO_2$ clathrate sinks, some embodiments can include attaching weights to the encapsulated $CO_2$ clathrate. Additionally or alternatively, the encapsulated hydrate can be further anchored to the ocean floor by placing a hydrate forming constituent between it and the ocean floor, thereby forming a hydrate between and attached to the encapsulated $CO_2$ clathrate and the ocean floor. In certain embodiments, the hydrate forming constituent can be $CO_2$ or methane.

DETAILED DESCRIPTION

Definitions

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the apparatuses and processes encompassed are not limited to the specific embodiments described below, but rather, include all alternatives, modifications, and equivalents falling within the true spirit and scope of the appended claims.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

As used herein, "about" is a preposition describing some quantity or parameter value, and indicates that some variation around the stated amount or value is included. Generally, the degree of variation intended to be encompassed is that which would be understood by one of ordinary skill in the art not to materially affect the performance of an apparatus or device or a characteristic of a material or composition described by the amount or parameter. The degree of variation encompassed can be influenced by the ability of an artisan or ordinary skill to measure or control the amount or value in operation of a process or production of a substance or composition. In some instances, variation of up to 10% is envisioned. In some instances variation of up to 5% is envisioned. In some instances variation of up to 1% is envisioned. In some instances, variation of up to 0.5% is envisioned. In some instances, variation of up to 0.1% is envisioned.

As used herein, an "aqueous phase" is water, a water solution of one or more dissolved substances, or either of these that includes a suspension of hydrate particles. The "dissolved substances" of a water solution can include molecules of gas partitioned into the aqueous phase from a gas being separated by the presently disclosed process. "Dissolved substances" can also include salts and organic molecules, either added to or originally present in the water forming the aqueous phase (for example substances present in seawater that might be used as the aqueous phase in some embodiments). "Dissolved substances" can also include thermodynamic hydrate promoters and kinetic hydrate promoters added to the aqueous phase. "Dissolved substances" can also include dissolved clathrates that have not agglomerated into substantial particles. "Hydrate particles" can include particles of sufficiently small size to remain suspended by flow of a slurry of the particles in the aqueous phase, and can also include aggregates of clathrate particles that have accreted to a size visible to the naked eye or larger, e.g. as to settle from a standing aqueous phase under the influence of gravity. Hydrate collected from disclosed processes and apparatus can be in solid form of substantial mass.

As used herein, a "clathrate" is a weak composite made of a host compound that forms a basic framework and a guest compound that is held in the host framework by intermolecular interaction, such as hydrogen bonding, Van der Waals forces, and the like. Clathrates may also be called "host-guest complexes", "inclusion compounds", and "adducts". As used herein, a molecular modifier to the term "clathrate" means that the molecule is more abundant than any other enclathrated guest molecule, e.g. a "$CO_2$ clathrate" means a clathrate wherein $CO_2$ is present in the clathrate in quantities more abundant than any other enclathrated guest molecule. As used herein, "clathrate" and "hydrate" are interchangeable terms used to indicate a clathrate having a basic framework made from water as the host compound. A hydrate is a crystalline solid which looks like ice, and forms when water molecules form a cage-like structure around a "hydrate-forming constituent."

Formation of a hydrate or clathrate is described herein as a "reaction", since a stable structure is formed (under appropriate conditions) from two previously separated compounds, although no chemical bonds are changed.

As used herein, a "hydrate-forming constituent" refers to a compound or molecule in a fluid, including natural gas, that forms hydrate at elevated pressures and/or reduced temperatures. Illustrative hydrate-forming constituents include hydrocarbons such as methane, ethane, propane, butane, neopentane, ethylene, propylene, isobutylene, cyclopropane, cyclobutane, cyclopentane, cyclohexane, and benzene. Hydrate-forming constituents can also include non-hydrocarbons, such as oxygen, nitrogen, hydrogen sulfide, carbon dioxide, sulfur dioxide, and chlorine.

As used herein, a "compressor" is a machine that increases the pressure of a gas by the application of work (compression). Accordingly, a low pressure gas (for example, at 5 psig) may be compressed into a high-pressure gas (for example, at 1000 psig) for transmission through a pipeline, injection into a well, or other processes.

As used herein, a "column", "tower" or "reactor" means a fractionation column or zone, i.e., a contacting column or zone, wherein liquid and vapor phases can be counter-currently contacted to effect separation of compounds in a mixture of phases. For example, a separation in a vapor-liquid-hydrate system may be performed by contacting of the vapor and liquid phases (which can include hydrate under appropriate conditions) on a series of vertically spaced trays or plates mounted within a column and/or on packing elements such as structured or random packing. Further, a separation of compounds in a mixture of solid, liquid, and vapor phases may be effected by a contacting countercurrent flow of the solid and/or liquid phases (which may contain hydrate) in an opposite direction to a vapor phase.

As used herein, a "geologic formation" is any finite subsurface region. A geologic formation may encompass a large open space, either naturally or man-made, and/or may contain one or more hydrocarbon containing layers, one or more non-hydrocarbon containing layers, an overburden, and/or an underburden of any subsurface geologic formation. An "overburden" and/or an "underburden" is geological material above or below the geologic formation of interest.

As used herein, the term "gas" is used interchangeably with "vapor," and means a substance or mixture of substances in the gaseous state as distinguished from the liquid or solid state. Likewise, the term "liquid" means a substance or mixture of substances in the liquid state as distinguished from the gas or solid state. As used herein, "fluid" is a generic term that may include either a gas or vapor.

As used herein, "kinetic hydrate promoter" ("KHP") refers to a molecule and/or compound or mixture of molecules and/or compounds capable of increasing the rate of hydrate formation in a fluid that is either liquid or gas phase. A kinetic hydrate promoter can be a solid or liquid at room temperature and/or operating conditions.

As used herein, the term "minimum effective operating pressure" refers to the pressure below which hydrates do not form in fluids containing hydrate forming constituents during the time the fluids are resident in a vessel or line.

As used herein, the term "maximum effective operating temperature" refers to the temperature above which hydrates do not form in fluids containing hydrate forming constituents during the time the fluids are resident in a vessel or line. For thermodynamic promotion of hydrate formation only, the maximum effective operating temperature is higher than the maximum effective operating temperature in the absence of the addition of a THP. When a kinetic hydrate promoter is added together with a THP, the maximum effective operating temperature is typically higher than the thermodynamically promoted hydrate formation temperature.

As used herein, a "plant" is a known apparatus or a collection of known apparatuses operably connected to perform a stated function. For example, a "cooling plant" will include equipment for chilling of a liquid passing through the cooling plant. A "facility" is a collection of plants that together accomplish one or more functions. In its broadest sense, the term plant is applied to any equipment that may be present along a flow path of a system as disclosed herein.

As used herein, "pressure" is the force exerted per unit area by the gas on walls enclosing a volume. Pressure can be shown as pounds per square inch (psi). "Atmospheric pressure" refers to the local pressure of the air. "Absolute pressure" (psia) refers to the sum of the atmospheric pressure (14.7 psia at standard conditions) plus the gage pressure (psig). "Gauge pressure" (psig) refers to the pressure measured by a gauge, which indicates only the pressure exceeding the local atmospheric pressure (i.e., a gauge pressure of 0 psig corresponds to an absolute pressure of 14.7 psia). The term "vapor pressure" has the usual thermodynamic meaning. For a pure component in an enclosed system at a given pressure, the component vapor pressure is essentially equal to the total pressure in the system.

As used herein, a "stage" in a column or reactor is a zone of controlled temperature within the reactor. The temperature to be set at each stage in the reactor can be determined by calculating phase diagrams for vapor-liquid (v-l), vapor-liquid-hydrate (v-l-h) and liquid-hydrate (l-h) phase diagrams for a feed gas composition, of the two gases to be separated ($N_2$ and $CO_2$, for example, as below) for mol % of one of the gases to be separated from the feed vs. temperature at a given pressure. A temperature for the first stage can be selected by picking a temperature between the equilibrium incipient hydrate curve and incipient vapor curve at the composition desired in the hydrate phase. A temperature of the last stage is selected by picking the temperature on the incipient vapor curve at the composition desired in the gas phase. Temperatures of intermediate phases, if any, are identified by noting the composition of the incipient vapor at the temperature selected for the first stage, then noting the temperature of the incipient hydrate curve at this composition as the temperature for the second stage. The temperature of the third stage is selected by noting the composition at the incipient vapor curve at the temperature of the second stage, then noting the temperature of the incipient hydrate curve at this composition, etc.

Stages in a hydrate formation reactor are implemented by establishing a zone of controlled temperature at a particular section of a hydrate forming reactor, as described further below.

As used herein, "substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context.

As used herein, "thermodynamic hydrate promoter" (THP) refers to a molecule and/or compound, or mixture of molecules and/or compounds capable of reducing the hydrate formation pressure (at a given temperature) in a fluid that is either liquid or gas phase. The addition of a THP to the fluid also has the effect of raising the temperature at which hydrates form at a given pressure.

Figure 1:
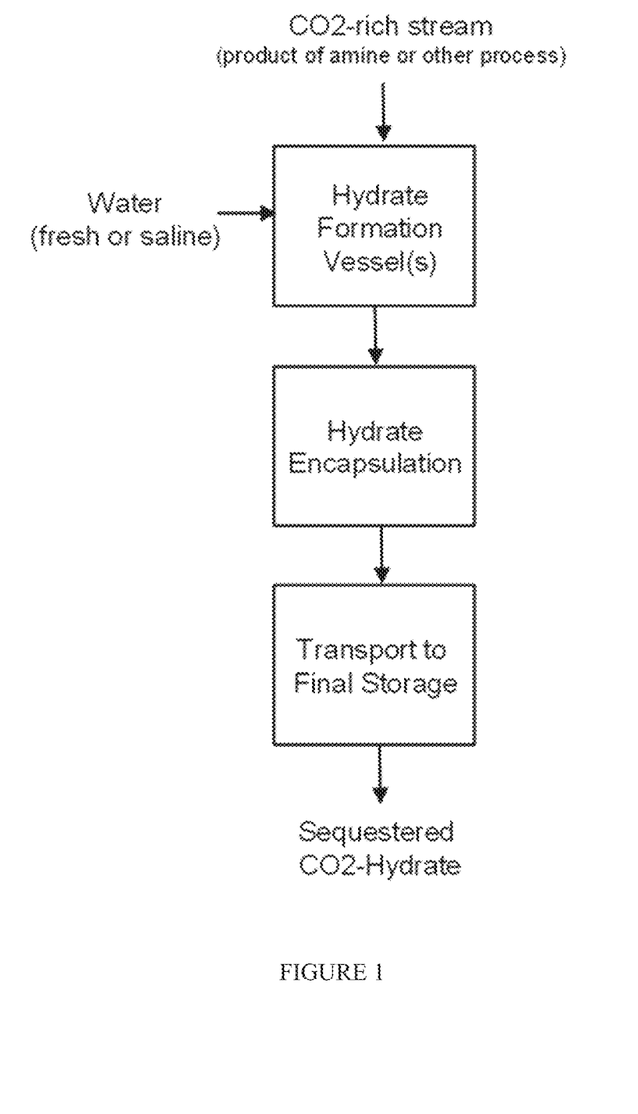
FIG. 1 is a flowchart of an exemplary $CO_2$ sequestration process described herein.

The methods disclosed herein can be described with reference to the figures. FIG. 1 illustrates a high level flow chart of the methods according to the present disclosure. As shown therein, the first step is to admit a $CO_2$-rich stream into a hydrate forming vessel/reactor. Once formed, the hydrate is encapsulated with a barrier intended to keep the hydrate stable. After the hydrate is encapsulated, it is transported to its position of final storage. The resulting product is an encapsulated and stable $CO_2$ hydrate sequestered such that gaseous $CO_2$ will not be released to the atmosphere under ambient surrounding conditions.

Figure 3:
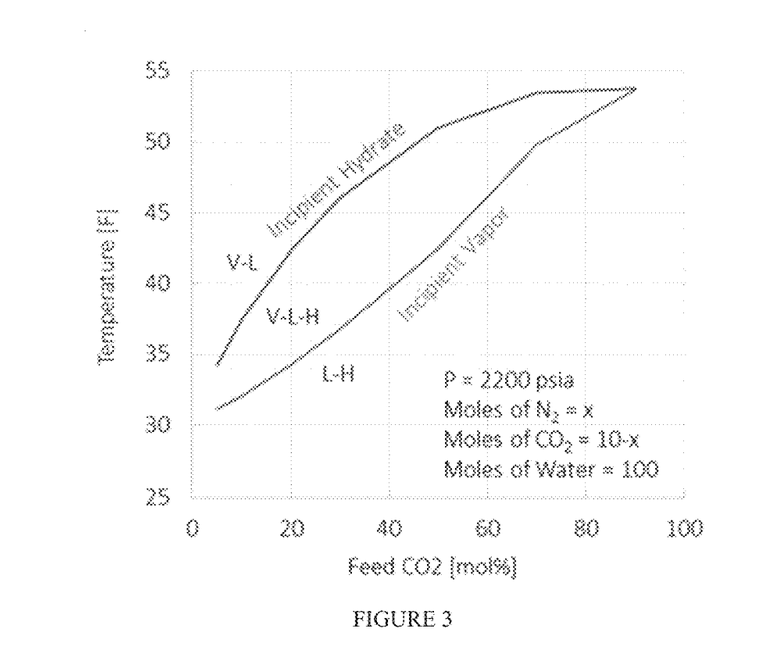
FIG. 3 graphically depicts $CO_2$ hydrate formation as a function of $CO_2$ feed percentage and water temperature at a constant pressure.
Figure 4A:
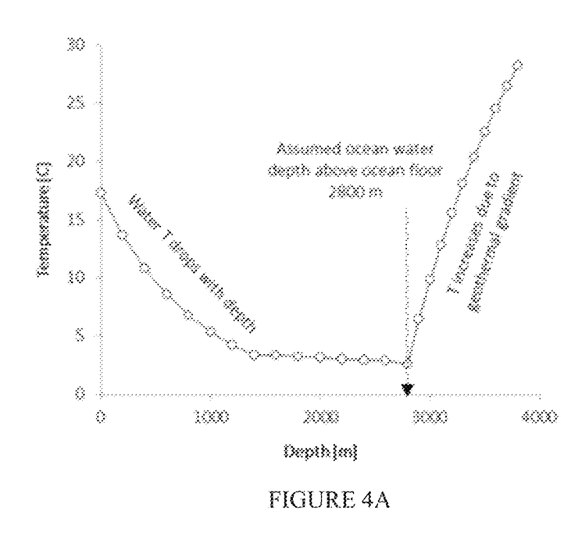
FIG. 4A graphically depicts generic seawater temperature as a function of depth.
Figure 4B:
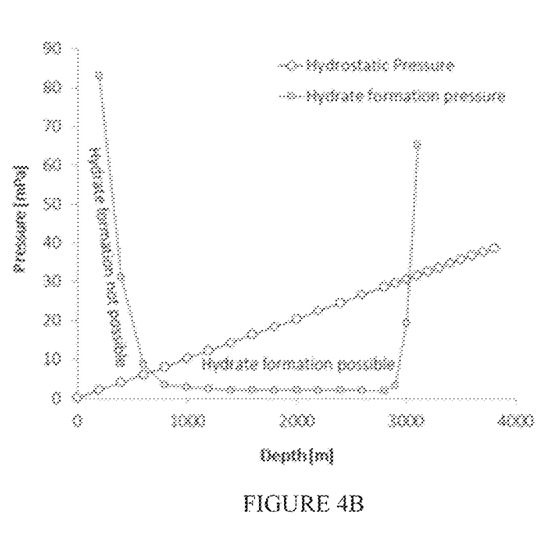
FIG. 4B graphically depicts a $CO_2$ hydrate formation envelope as a function of pressure using temperature inputs from FIG. 4A.
Figure 5A:
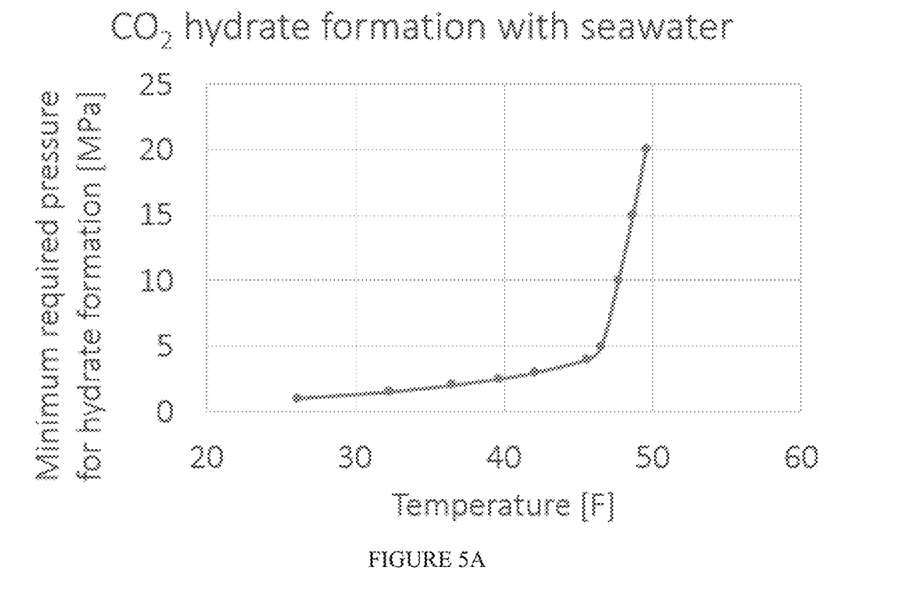
FIG. 5A graphically depicts minimum required pressure for hydrate formation as a function of temperature.
Figure 5B:
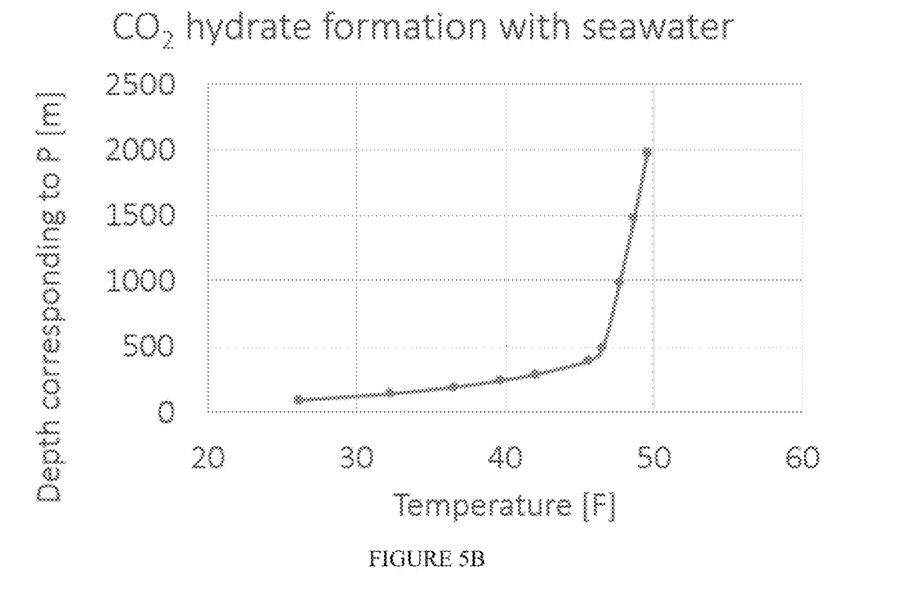
FIG. 5B graphically depict minimum required depth for hydrate formation as a function of temperature wherein the minimum depth corresponds to the pressure inputs from FIG. 5A.

Hydrate Formation $CO_2$ hydrate formation is a function of temperature, pressure, and $CO_2$ concentration in the feed. FIG. 3 provides a phase diagram for the formation of $CO_2$ hydrates at given pressure of 2200 psia (about 15.1 MPa). As shown, there is an incipient hydrate line, above which $CO_2$ exists only in liquid and vapor form, an incipient vapor line, below which $CO_2$ exists only in liquid and hydrate form, and an envelope in between the two wherein in $CO_2$ exists in liquid, vapor, and hydrate form. FIGS. 4A and 4B depict similar parameters as they exist in an oceanic environment. Temperature decreases and pressure increases with depth. In FIG. 4B, the envelope between the hydrostatic pressure line and the hydrate formation line indicates a pressure, temperature, and depth where hydrate formation is possible. It should be noted that hydrate formation feasibility is strongly dependent on the temperature at a given depth (or pressure); calculations shown in FIGS. 4A and 4B are for illustrative purposes only. FIGS. 5A and 5B, again illustrate, hydrate formation curves as a function of temperature and pressure (FIG. 5A) or depth (FIG. 5B) in seawater. As shown, the pressure required for hydrate formation increases as temperature increases.

Figure 6A:
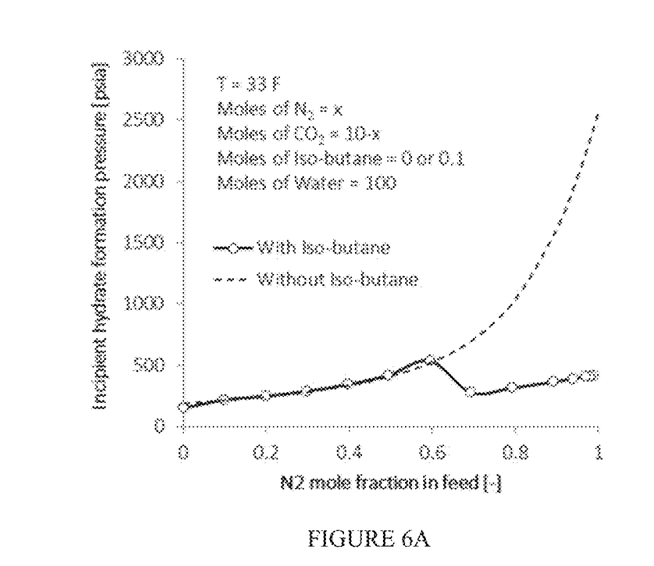
FIG. 6A graphically depicts the minimum required pressure for hydrate formation as a function of $N_2$ mole fraction in the feed with and without isobutane additive.
Figure 6B:
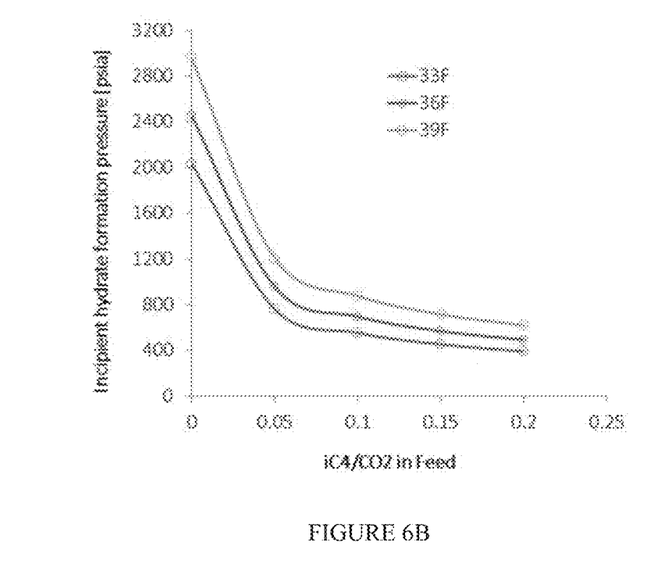
FIG. 6B graphically depicts the minimum required pressure for hydrate formation at different temperatures based on $CO_2$ fraction in the feed with isobutane additive.
Figure 7:
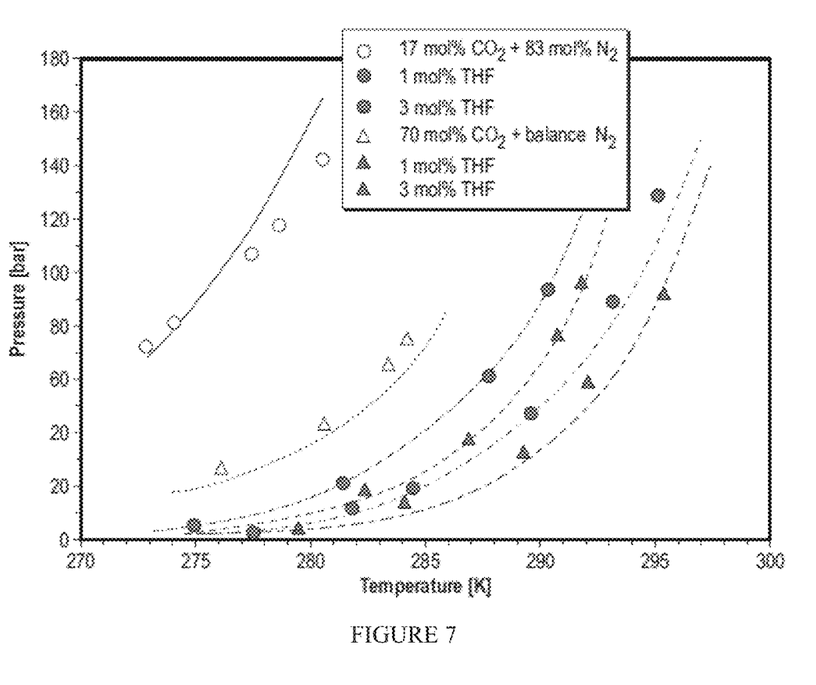
FIG. 7 shows hydrate formation phase diagrams for a 17:83 mol % $CO_2$-$N_2$ mixture and for such mixtures to which varying amounts of THF are added. S. Kang, H. Lee, C. Lee and W. Sung, "Hydrate phase equilibria of the guest mixture containing $CO_2$, $N_2$, and Tetrahydrofuran," *Fluid Phase Equilibria*, vol. 185, p. 101 (2001).
Figure 8A:
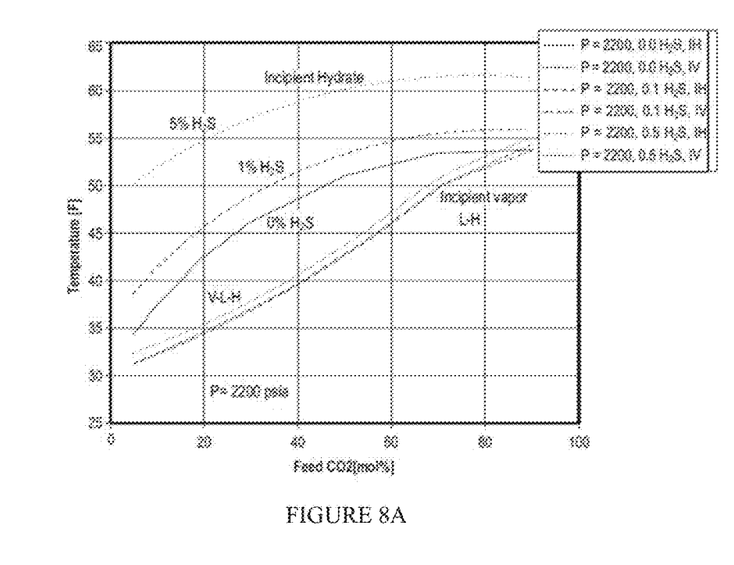
FIGS. 8A and 8B show the effect of addition of $H_2S$ to the feed gas on the envelope for hydrate formation and required depth, respectively.
Figure 8B:
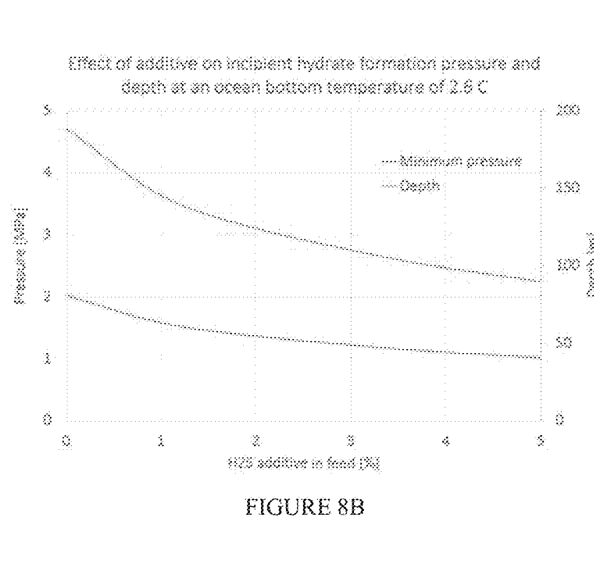

A hydrate formation promoter can be added to either the gas stream or to the aqueous phase. Hydrate formation promoters can be of either the thermodynamic or kinetic type. A thermodynamic hydrate formation promoter ("THP") changes the equilibrium conditions for hydrate formation and will lower the pressure at which hydrates are able to form. A kinetic hydrate formation promoter ("KHP") accelerates the rate of hydrate formation without changing the equilibrium conditions. Examples of THPs include acetone, propane, isobutane, cyclopentane, carbon tetrachloride, bromoform, chloroform, ethylene dichloride, methylene chloride, methyl iodide, methylene iodide, and the tri-halogen compounds of methane and ethane, propylene oxide, 1,4-dioxane, tetrahydrofuran and $H_2S$, surfactants (e.g. TBAB—Tetra n-Butyl Ammonium Bromide, TBAF—Tetra n-Butyl Ammonium Fluoride, TBACl—Tetra n-Butyl Ammonium Chloride), and enzymes (glucoamylase). Examples of KHPs include surfactants (e.g. SDS—Sodium Dodecyl Sulfate, DTAC—Dodecyl Trimethyl Ammonium Chloride) and inorganic or organic salts (e.g. NaCl). FIGS. 6A and 6B show the change in equilibrium conditions that can occur with the addition of isobutane. FIG. 7 shows a similar change for tetrahydrofuran. FIGS. 8A and 8B depicts a change in equilibrium conditions with the addition of $H_2S$. In all cases of adding THPs, the temperature of incipient hydrate formation increases whereas the pressure of incipient hydrate formation decreases.

In a certain embodiment, the hydrate forming reactor ("HFR") accomplishes intimate mixing of the gas and aqueous phases in a countercurrent flow. Apparatus and methods for mixing gases and aqueous phases are known, and include bubbling of gas through a column of the aqueous phase, venturi-type mixers, "bubble tray" or "liquid tray" arrangements within towers that are contacted with a flow of the liquid phase or with a flow of the gas phase, respectively, and distribution of the aqueous phase as a mist or fine droplets that are carried through the gas phase or fall through it under the influence of gravity. See, for example, U.S. Pat. Nos. 2,410,583, 5,434,330, 6,111,155, 6,028,234, 6,797,039 and US20130012751, all hereby incorporated by reference in their entirety and for all purposes.

The hydrate forming reactor may also comprise a series of stages, which are established by creating zones within the reactor that are controlled to a selected temperature by either refrigeration or heating as necessary. For example, in a reactor in which a flow of gas upward is contacted by a flow of aqueous phase as a falling mist, zones of defined temperature can be established by baffles perforated by riser tubes, each baffle being configured to carry a heat exchange fluid so as to control the temperature of the baffle and associated riser tubes to a selected temperature by heating or refrigeration of the heat exchange fluid. As another example, in a "tray" arrangement, the temperatures of each of the trays can be individually controlled.

A gas feed inlet to the HFR is configured to feed a gas stream into the vessel. The gas feed can be located at the first end (which can be the bottom, if the HFR is oriented vertically) of the vessel encompassing the HFR, but is typically located some distance from the first end so that a "feed stage" can be established that is somewhat distal from the first end, allowing for separation stages upstream (for the gas flow) from the gas feed inlet. The particular form of the gas feed inlet will depend upon the overall design of the HRF. For example, if a feed is bubbled into the reactor, a sparger or an arrangement of a plurality of small nozzles might be used as the gas inlet. Heating or cooling apparatus, a pump or compressor, and the like, can be incorporated into a gas feed inlet to the HFR. Control of the gas feed, including of its temperature and pressure, is considered well-known in the art.

The gas feed inlet of the HFR can be configured to include an inlet that allows for introducing a hydrate promoter into the gas phase.

An aqueous phase inlet is configured to feed an aqueous phase into the vessel. An aqueous phase inlet can include an input for "make-up" water, which can be either fresh water, seawater, other salty water, or a combination thereof.

The aqueous phase inlet is typically placed at the second end of the vessel that encompasses the HFR, although alternative arrangements are also envisioned in which a number of aqueous phase inlets are provided distributed along the length of the HFR proximate to the second end of the HFR. As for the gas inlet, the specific form of the aqueous phase inlet will depend on the overall design of the HFR. For example, if the counterflow of the aqueous phase is in the form of a falling mist, the aqueous phase inlet can be arranged as a plurality of fine nozzles disposed around the circumference of the top of the HFR that is oriented vertically.

The aqueous phase inlet can be configured to include a mixer for introducing an amount of one or more hydrate promoters, in either liquid or solid form, into the aqueous phase.

The aqueous phase inlet can also be configured to include a mixer for introducing one or more inorganic or organic salts or surfactants into the aqueous phase. The salt(s) may be added in solid form or as a solution. A salt solution of the aqueous phase allows chilling of the aqueous phase to temperatures below 32° F. (0° C.). Ocean water may be used as the aqueous phase.

The form of the hydrate slurry outlet(s) of the HFR is considered known in the art and again the specific form will depend on the overall design of the HFR and also to the form of the hydrate (e.g. particle size) and its concentration in the slurry.

The form of the one or more gas product outlets is also considered known in the art, and again the specific form will depend on the overall design of the HFR. The end use of the product gas will be considered in selecting the form of the gas product outlet. For instance, if the product gas is to be discharged to the atmosphere as a pure gas, a simple pressure release valve can suffice. On the other hand, if the product gas is to be used to drive a turbine, then the product gas outlet will be configured with appropriate couplings for attaching to a gas pipeline or storage vessel and to appropriate pressure controls.

A system for separating $CO_2$ from combustion or other gases and forming $CO_2$ hydrates can include a plurality of HFRs arranged in series. In such an arrangement, the hydrate product from a first HFR is decomposed and the gas released from the first decomposed hydrate is used as the gas feed (which can be mixed with, e.g. a hydrate promoter as described below) into a second HFR. Such a second or yet additional HFR(s) can be operated at the same pressure and/or temperature as the first HFR, or can be operated at a reduced pressure and/or different temperature gradient or step series, compared to the pressure and temperatures in the first, or upstream HFR (e.g., 2200 psia for the first of two HFRs, and 1000 psia for the second of two HFRs). A measurement of the composition of gas released from the decomposed hydrate obtained from an upstream HFR or calculation of the composition of the hydrate from equilibrium principles can be used to set the composition of the input gas for calculation of the staging to be used in a respectively downstream HFR.

In an alternative arrangement, the slurry from the first HFR is transported to a second HFR for use in the aqueous phase, and different conditions of pressure and/or temperature are used in the second reactor to change the hydrate composition. Whatever gas is released during a pressure change can be combined with the $N_2$-rich phase for power recovery, or put to another industrial use, or vented to the atmosphere if the gas does not contain a lot of $CO_2$.

A system for separating $CO_2$ from combustion or other gases can further include a solid-liquid (SLS) separator configured to receive an aqueous hydrate slurry from the hydrate slurry outlet for separation into an aqueous phase product and a solid hydrate. The SLS can be integral with the HFR at the first end of the vessel. In such an instance of a SLS integral with the HFR, the hydrate slurry outlet can be replaced by an outlet suitable for conveying a solid hydrate material from the HFR and an outlet suitable for conveying an aqueous phase from the HFR. The hydrate product of the SLS can be collected and transported and/or sequestered as a concentrated hydrate product, or decomposed as described further below.

When the system includes a SLS, the system can further include an aqueous phase recirculation line that connects a reservoir or pipe of the SLS holding the recovered aqueous phase to the vessel of the HFR, typically via the aqueous phase inlet, but in some embodiments a separate inlet for the recirculating aqueous phase can be provided. Aqueous phase recovered from the hydrate separation can be recirculated back to the HFR via this line. The aqueous phase recirculation line can include a cooling plant to cool the aqueous phase prior to introducing the recycled aqueous phase back into the HFR. The aqueous phase recirculating line can alternatively or additionally include an inlet for adding a kinetic hydrate promoter to the recirculating aqueous phase.

Unless otherwise indicated, for instance by more detailed description, movement of gases and fluids, and control of their temperature and pressure, is considered known in the art. Accordingly, the flow lines, inlets and outlets described herein may be considered to include apparatus for moving and controlling the flow of fluids between and within components of the systems disclosed, such as pumps, compressors, valves of different kinds, meters, feedback controls, digital controls and the like, as one of ordinary skill in the art would expect to use.

Hydrate Encapsulation

The major issue with $CO_2$ hydrate sequestration in an oceanic environment has been the instability of $CO_2$ hydrates in such environments. For example, Report PH4/26 of the International Energy Agency Greenhouse Gas Research and Development Programme in 2004 concluded that, "$CO_2$ cannot be stored in the deep ocean in the form of hydrates for any significant period because the material is not stable." In other words, $CO_2$ hydrates in an oceanic or atmospheric environment are particularly susceptible to decomposition as $CO_2$ escapes the hydrate phase and moves into its surroundings.

In order to combat this problem, the present disclosure proposes to encapsulate the formed $CO_2$ hydrate prior to sequestration. The barrier formed by the encapsulation must be such that it does not allow migration of molecules from the hydrate to the environment in which the hydrate is sequestered or from the environment to the hydrate. For the purposes herein, such as barrier will be referred to as a "molecular barrier."

Suitable molecular barriers include manmade substances such as plastics—e.g. polyethylene and polypropylene—concrete, metal alloys, etc. Molecular barriers may also include naturally occurring such as clays or other soils formed to provide a molecular seal impermeable to an aqueous phase. Such naturally occurring materials may also be incorporated within a manmade molecular barrier.

Hydrate Sequestration

Figure 2:
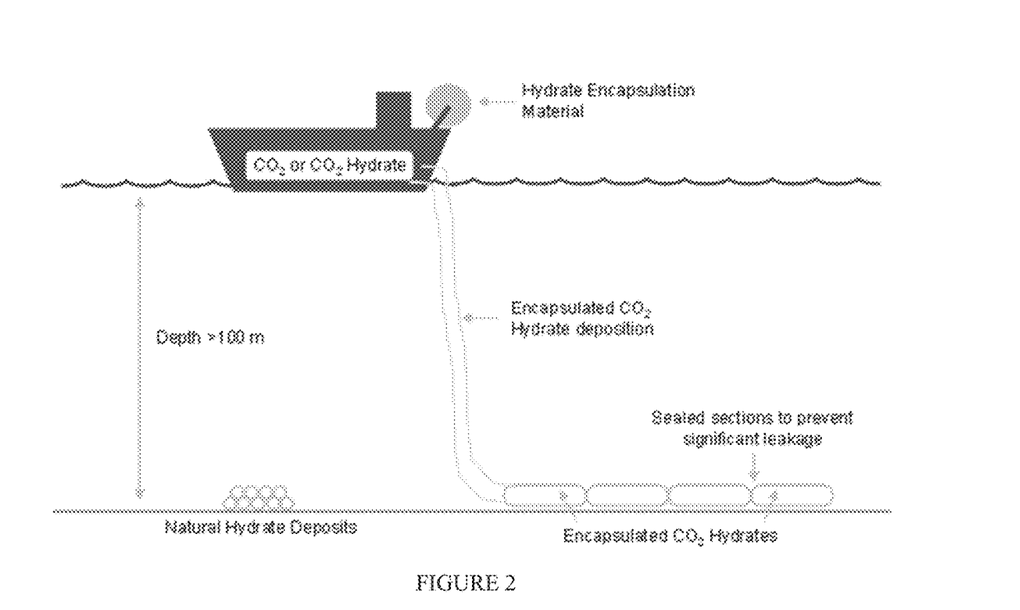
FIG. 2 illustrates an implementation of an exemplary $CO_2$ sequestration process described herein.

Once the hydrate has been encapsulated, it must be sequestered. In a preferred embodiment, the $CO_2$ hydrate is sequestered in an oceanic environment. FIG. 2 illustrates an implementation of an exemplary $CO_2$ sequestration process. As depicted therein, a seagoing vessel, such as a small tanker, intermediate tanker, MR1, MR2, LR1, LR2, VLCC, or ULCC, transports liquefied $CO_2$ or $CO_2$ hydrate to a deposition point in the open ocean.

The vessel can include an HFR such that the $CO_2$ hydrates can be formed aboard the vessel. Alternatively, the vessel can receive formed $CO_2$ hydrates from a land-based facility. The vessel may be equipped with a hydrate encapsulation system to encapsulate the formed $CO_2$ hydrates. Alternatively, the $CO_2$ hydrates may be encapsulated at a land-based facility prior to loading on the vessel. The encapsulated $CO_2$ hydrates may then be sequestered on the ocean floor. This may be accomplished by simply dropping a weighted encapsulated hydrate off the vessel or directly depositing the encapsulated hydrate onto the ocean floor. In order for the hydrate to remain stable (and not decompose into liquid $H_2O$ and gaseous $CO_2$, which would place undue stresses on the encapsulation), it must be placed at a depth greater than 800 m (assuming an ocean temperature profile from FIG. 4A). As described above, however, the hydrate formation process can include the addition of a thermodynamic hydrate formation promoter (THP). The addition of a THP will allow sequestering of the hydrate in shallower oceanic environments, such as from 100-800 m, 100-700 m, 100-600 m, 100-500 m, 100-400 m, 100-300 m, 100-200 m. Furthermore, depending on the geographic region or location, a colder temperature profile for the ocean will also allow for hydrate sequestration at shallower depths.

As indicated above, the encapsulated $CO_2$ hydrates may be stabilized on the ocean floor through use of weights or anchoring materials such as weighted nets, rocks, etc. In addition, gas hydrates, such as methane hydrates, can form naturally and be stable in deep ocean (greater than 1000 m) environment. Naturally occurring gas hydrates are sticky. Injecting a gas, such as $CO_2$ or methane, underneath the encapsulated $CO_2$ hydrate would promote $CO_2$ or methane hydrates to form between the ocean floor and the encapsulated $CO_2$ hydrate. These external hydrates may also help keep the encapsulated $CO_2$ hydrates in place. Additionally or alternatively, the encapsulated $CO_2$ hydrates may also include an additional pocket of $CO_2$ or methane gas outside the molecular barrier. The pocket would be on the ocean floor facing portion of the $CO_2$ hydrate and designed to allow $CO_2$ to contact seawater on the ocean floor, thereby forming $CO_2$ hydrates between the ocean floor and the encapsulated $CO_2$ hydrate.

Additional Embodiments

Embodiment 1. A method of sequestering clathrates, comprising: forming a $CO_2$ clathrate, and encapsulating the $CO_2$ clathrate within a molecular barrier.

Embodiment 2. The method of embodiment 1, further comprising: depositing the encapsulated $CO_2$ clathrate on the ocean floor at a sufficient depth such that the $CO_2$ clathrate will not decompose into liquid or vapor $CO_2$ and water.

Embodiment 3. The method of embodiment 2, wherein the depositing comprises transferring the encapsulated $CO_2$ clathrate to a seagoing vessel; transporting the seagoing vessel to a deposition location; and depositing the encapsulated $CO_2$ clathrate on the ocean floor.

Embodiment 4. The method of embodiment 2, wherein the $CO_2$ clathrate is formed and encapsulated on a seagoing vessel.

Embodiment 5. The method of embodiment 4, wherein the depositing comprises transporting the seagoing vessel to a deposition location; and depositing the encapsulated $CO_2$ clathrate on the ocean floor.

Embodiment 6. The method of any of the previous embodiments, wherein the forming further comprises injecting the $CO_2$ clathrate with a hydrate formation promoter.

Embodiment 7. The method of embodiment 6, wherein the hydrate formation promoter is one of acetone, propane, isobutane, cyclopentane, carbon tetrachloride, bromoform, chloroform, ethylene dichloride, methylene chloride, methyl iodide, methylene iodide, and the tri-halogen compounds of methane and ethane, propylene oxide, 1,4-dioxane, tetrahydrofuran and $H_2S$, surfactants (e.g. TBAB—Tetra n-Butyl Ammonium Bromide, TBAF—Tetra n-Butyl Ammonium Fluoride, TBACl—Tetra n-Butyl Ammonium Chloride), and enzymes (glucoamylase).

Embodiment 8. The method of embodiments 6 or 7, wherein the hydrate formation promoter is one of isobutane, tetrahydrofuran, and $H_2S$.

Embodiment 9. The method of any of embodiments 2-8, wherein the sufficient depth is less than 800 m or 100 m-400 m.

Embodiment 10. The method of any of the previous embodiments further comprising attaching weights to the encapsulated $CO_2$ clathrate.

Embodiment 11. The method of any of embodiments 2-10, wherein depositing the encapsulated $CO_2$ clathrate on the ocean floor comprises placing a hydrate forming constituent between the encapsulated $CO_2$ clathrate and the ocean floor, thereby forming a hydrate between and attached to the encapsulated $CO_2$ clathrate and the ocean floor.

Embodiment 12. The method of embodiment 11, wherein the hydrate forming constituent is $CO_2$ or methane.

Embodiment 13. The method of any of the previous embodiments, wherein the molecular barrier comprises at least one of polyethylene and polypropylene.

Embodiment 14. The method of any of the previous embodiments, wherein the molecular barrier further comprises a weighted covering of naturally occurring materials, such as clay.

Embodiment 15. The method of any of the previous embodiments, wherein forming the $CO_2$ clathrate further comprises: providing a $CO_2$-rich stream from a separate refinery process such as a $CO_2$ adsorption or absorption process; providing an aqueous phase stream in a countercurrent flow to form a $CO_2$ clathrate in the aqueous phase, a temperature $T_f$ being maintained at a gas feed stage f in the countercurrent flow, a temperature $T_2$ such that $T_2 < T_f$ being maintained at a stage n>f, and a temperature $T_1$ being maintained at a stage m≤f such that $T_1 \geq T_f$; wherein: $T_2$ is in the range from the incipient vapor temperature for $CO_2$ to the incipient clathrate temperature for $CO_2$ at the operating pressure of the process, and $T_1$ is a temperature at or below a temperature of convergence of the incipient $CO_2$ clathrate formation and incipient $CO_2$ vapor formation curves at the operating pressure of the process.

Embodiment 16. The method of embodiment 15, wherein the aqueous phase stream is at least partially seawater.

The invention claimed is:

1. A method of sequestering clathrates, comprising:
forming a $CO_2$ clathrate and injecting the $CO_2$ clathrate with a hydrate formation promoter, and
encapsulating the $CO_2$ clathrate within a molecular barrier, and depositing the encapsulated $CO_2$ clathrate on the ocean floor at a sufficient depth such that the $CO_2$ clathrate will not decompose into liquid or vapor $CO_2$ and water, wherein the sufficient depth is from 100 m-400 m, wherein depositing the encapsulated $CO_2$ clathrate on the ocean floor comprises placing a hydrate forming constituent between the encapsulated $CO_2$ clathrate and the ocean floor, thereby forming a hydrate between and attached to the encapsulated $CO_2$ clathrate and the ocean floor.

2. The method of claim 1, wherein the hydrate forming constituent is $CO_2$ or methane.

3. The method of claim 1, wherein the molecular barrier comprises at least one of polyethylene and polypropylene.

4. The method of claim 3, wherein the molecular barrier further comprises a weighted covering of naturally occurring material, wherein the naturally occurring material is clay.

5. The method of claim 1, wherein the depositing comprises transferring the encapsulated $CO_2$ clathrate to a seagoing vessel; transporting the seagoing vessel to a deposition location; and depositing the encapsulated $CO_2$ clathrate on the ocean floor.

6. The method of claim 1, further comprising:
attaching weights to the encapsulated $CO_2$ clathrate.

7. The method of claim 1, wherein the $CO_2$ clathrate is formed and encapsulated on a seagoing vessel.

8. The method of claim 7, wherein the depositing comprises transporting the seagoing vessel to a deposition location; and depositing the encapsulated $CO_2$ clathrate on the ocean floor.

9. The method of claim 1, wherein the hydrate formation promoter is one of acetone, propane, isobutane, cyclopentane, carbon tetrachloride, bromoform, chloroform, ethylene dichloride, methylene chloride, methyl iodide, methylene iodide, the tri-halogen compounds of methane and ethane, propylene oxide, 1,4-dioxane, tetrahydrofuran, $H_2S$, surfactants (wherein the surfactants are selected from the group consisting of TBAB—Tetra n-Butyl Ammonium Bromide, TBAF—Tetra n-Butyl Ammonium Fluoride, TBACl—Teta n-Butyl Ammonium Chloride), and enzymes, and combinations thereof.

10. The method of claim 9, wherein the hydrate formation promoter is one of isobutane, tetrahydrofuran, and $H_2S$.

* * * * *